Figure 3:
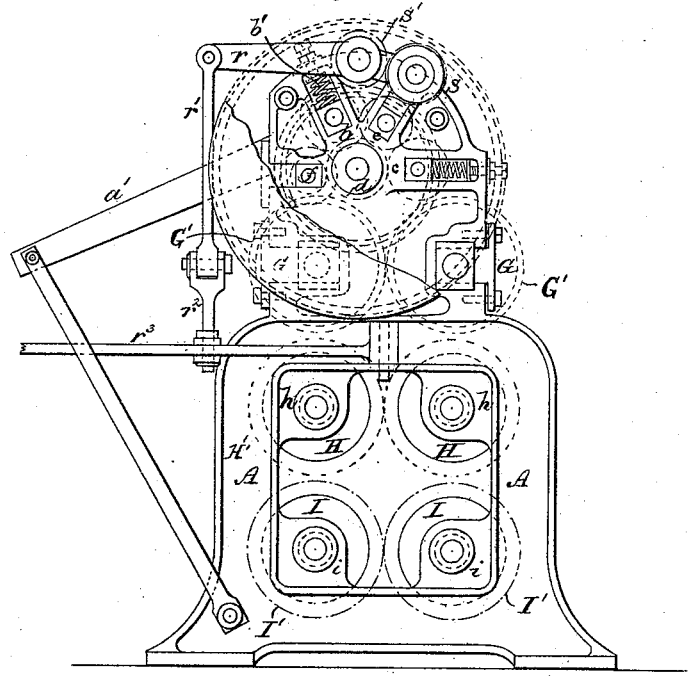

(No Model.) 2 Sheets—Sheet 1.
N. DE LANDTSHEER & T. C. BARRACLOUGH.
MACHINE FOR DECORTICATING, &c., RAMIE, &c.
No. 442,586. Patented Dec. 9, 1890.
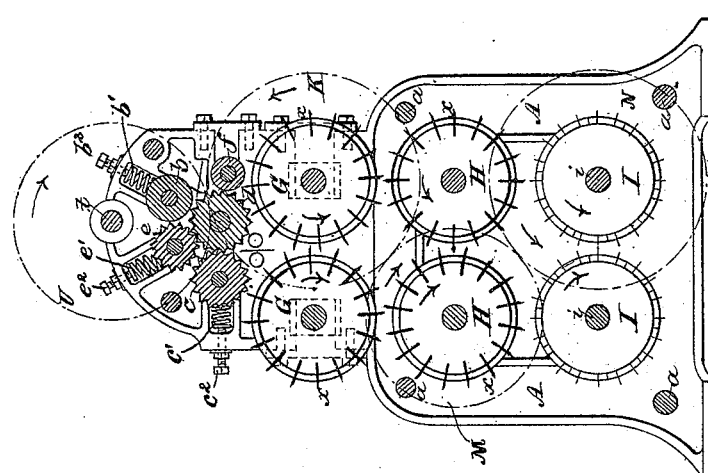
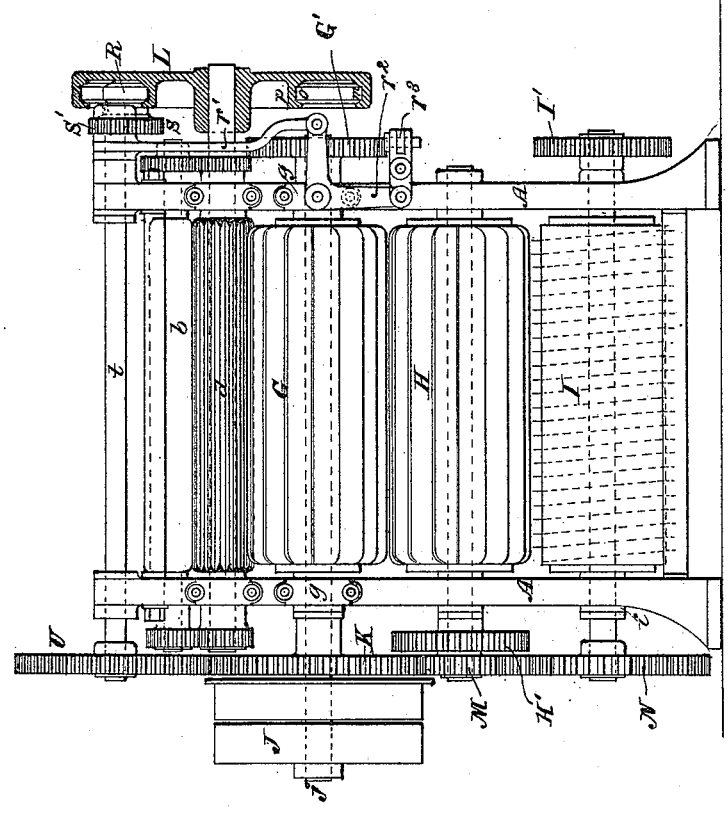

(No Model.) 2 Sheets—Sheet 2.

N. DE LANDTSHEER & T. C. BARRACLOUGH.
MACHINE FOR DECORTICATING, &c., RAMIE, &c.

No. 442,586. Patented Dec. 9, 1890.

UNITED STATES PATENT OFFICE.

NORBERT DE LANDTSHEER, OF PARIS, FRANCE, AND THOMAS CRITCH-
LEY BARRACLOUGH, OF MANCHESTER, ENGLAND.

MACHINE FOR DECORTICATING, &c., RAMIE, &c.

SPECIFICATION forming part of Letters Patent No. 442,586, dated December 9, 1890.

Application filed June 1, 1889. Serial No. 312,911. (No model.) Patented in France February 4, 1888, No. 188,540; in England April 21, 1888, No. 5,966; in Belgium July 20, 1888, No. 61,543; in Spain September 29, 1888, No. 1,444; in Austria-Hungary October 21, 1888, No. 22,709 and No. 39,111, and in Italy April 18, 1889, XLIX, 124.

*To all whom it may concern:*

Be it known that we, NORBERT DE LANDTSHEER, a subject of the King of Belgium, residing at Paris, France, and THOMAS CRITCHLEY BARRACLOUGH, a subject of the Queen of Great Britain, residing at Manchester, England, have invented new and useful Improvements in Machinery for Decorticating, Breaking, Scutching, and Dressing China Grass (Ramie,) Flax, Hemp, &c., (for which we have obtained Letters Patent in France, No. 188,540, dated February 4, 1888; in Great Britain, No. 5,966, dated April 21, 1888; in Belgium, No. 61,543, dated July 20, 1888; in Spain, No. 1,444, dated September 29, 1888; in Austria-Hungary, No. 22,709 and No. 39,111, dated October 21, 1888, and in Italy, No. XLIX, 124, dated April 18, 1889,) of which the following is a specification.

Our invention relates to new and useful improvements in machines employed for extracting the fibers from fiber-bearing plants, and which we call a "breaker-scutcher;" and the object of our invention is to produce a machine with which the fibers can be easily and thoroughly extracted from fiber-bearing plants, such as flax, hemp, manila, sisal, phormium tenax, China grass (ramie,) and similar plants in the dry or green state; also, to submit the said plants to the different processes of flattening the stems of leaves, breaking the woody parts, and cleaning, scutching, and dressing the fibers successively, all in one machine, and, finally, to facilitate the obtaining of such fibers in a long condition and to permit the adjusting of the different parts of the machine according to the different kinds of plants from which the fibers are to be extracted.

To this end our invention consists in the construction of a machine for first flattening the fiber-containing plants and stems by suitable rollers, then breaking the woody parts, next cleaning and scutching the fibers, and finally dressing them.

It also consists of peculiar mechanism by which the fibers receive a to-and-fro movement between the blades of the scutching-drums; and it finally consists in the construction of certain details and arrangements of parts, as more fully described hereinafter, and specifically pointed out in the claims.

Figure 4:
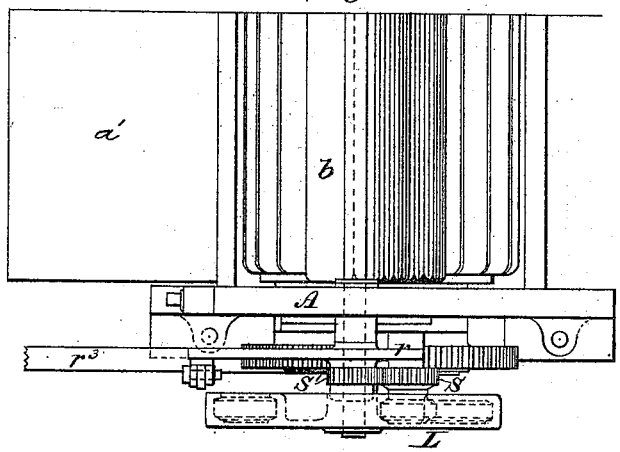
Figure 5:
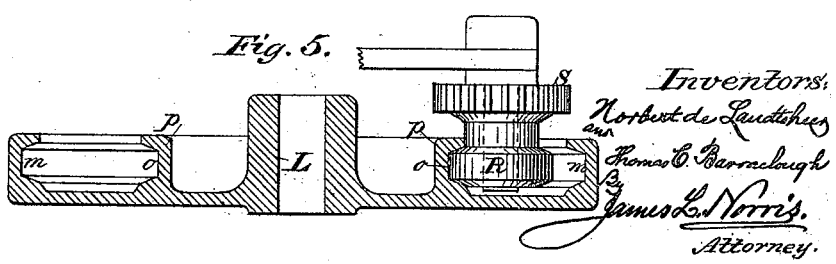

In the drawings, Figure 1 represents a front elevation, partly in section, of the machine containing our improvements. Fig. 2 is a cross-section of the same. Fig. 3 is a side elevation partly broken away. Fig. 4 is a half-plan of a breaker-scutcher embracing our improvements. Fig. 5 is an enlarged detail sectional view of the part of the machine by which the fibers receive a to-and-fro movement.

In the drawings, A represents the sides of the machine, which are preferably made of cast-iron, although they may be made of wood or other suitable material bolted together by bolts $a$.

Near the upper part of the machine is arranged a plain feed-roller $b$, running in touching contact with the flutes of the fluted roller $d$, (hereinafter called the "central roller,") and gearing therewith are the additional fluted rollers $c$ and $e$. The plain roller $b$ and the fluted rollers $c$ and $e$ are pressed against the central fluted roller $d$ by spiral springs $b'$ $c'$ $e'$, and can be adjusted by set-screws $b^2$ $c^2$ $e^2$, as seen in Figs. 2 and 3. Another plain roller $f$ is placed at the front side of the fluted roller $d$ to prevent any scutched material lapping around said roller $d$.

The material to be treated is fed to the machine upon a feed-table $a'$, Figs. 3 and 4, passing between the several rollers, as hereinafter described, and thence downward between a pair of scutching-drums G, journaled in bearings $g$. Below the drums G there is a similar pair of scutching-drums H, supported in bearings $h$, and finally below is a pair of combing-cylinders I, supported in bearings $i$ on the frame or sides.

The various rollers and drums are driven by gearing in the following manner: The rollers $b$ $c$ $e$ are geared, as shown by dotted lines in Fig. 3, to the central roller $d$, which is run from the driving mechanism, as hereinafter described, and each pair of drums is also geared together, as shown, by gearing G', H', and I', Figs. 1 and 3, although only one of these is geared to the driving mechanism. One of the drums G is mounted on and driven directly by the driving-shaft $j$.

The gearing K M N, Figs. 1 and 2, serves as suitable driving mechanism for the drums H and I.

The arrows shown in Figs. 2 and 3 will indicate the direction of revolution of all the rollers and drums.

In order to effectually clean the fibers it is necessary to impart to them a to-and-fro or reciprocating movement between the blades of the scutching-drums. For this purpose a specially-constructed friction-disk is mounted upon the end of the fluted cylinder $d$. This disk L is shown in section on an enlarged scale in Fig. 5, being provided with a pair of concentric annular grooves, one of which $m$ is arranged on the inside of the rim or flange of said disk and the other groove $o$ being formed directly opposite and in the same plane upon a large boss $p$, projecting from the inner face of the same disk. A friction-wheel R is placed between these grooves, so that it can be moved into either of these grooves. Said wheel is mounted upon a stud at the extremity of a lever or arm $r$. This friction-wheel R revolves on the same axis with a pinion S, which is driven by a similar pinion S', attached to a shaft $t$, which in turn receives motion, by means of a wheel U, from the main gear-wheel K.

It will be apparent that if the friction-wheel R, by means of the lever-arm $r$, is brought into contact with the groove $m$ of the disk L, the central fluted roller $d$ and all the rollers geared therewith will be driven in one direction, while if the wheel R is caused to enter the groove $o$ the direction of movement will be easily reversed and the mechanism will be driven at an accelerated speed in the opposite direction.

To operate the lever-arm $r$ from the front of the machine, its end is connected by the rod $r'$ and a bell-crank lever $r^2$ with a lever $r^3$, capable of moving sidewise to reverse the motion. In practice this improved system of reversing-gear permits of the sudden change of feed without causing any shock to the teeth of the gear-wheels, as it prevents the sudden backlash usually occurring with reversing mechanism.

The operation of the machine is as follows: The plants containing the fibers are placed on the table $a'$ and then fed to the plain feed-roller $b$, which acts on the fluted roller $d$ and serves to flatten the stems or leaves as they enter the machine. This flattening of the stems facilitates the breaking of the woody parts enveloped by the fibrous bars or skin without exposing the fiber to a shortening or tearing action. The breaking of the plants is next effected by passing the material between the fluted rollers $c$, $d$, and $e$, receiving a rotary motion, as described. The stems and leaves then pass vertically downward between the scutching-drums. This arrangement is important for the cleansing of the fiber, allowing the stems or leaves to be subjected simultaneously and in almost their entire length to the cleansing and scutching action of the scutching-drums G and H, provided with blades $x$. They are geared to run at a great speed. The interlapping of the blades $x$ can be adjusted according to the tenacity of the material and with a view of making the least quantity of waste tow. The vertical direction assumed by the fibers also permits the two drums of each pair of the scutching-drums to be placed on the same level, and also permits the blades to be varied in interlap. The scutching-blades can be of various forms and with various undulations while beating, scutching, or scraping the fibers in all directions and while moving to and fro between them.

The combing of the fibers is finally effected by placing below the scutching-drums one or more combing-cylinders I, provided with steel teeth, which serve to comb the fibers as they are presented. For very long fibers—such as hemp, &c.—the cylinders I may be replaced by endless aprons carrying lags with suitable teeth.

What we claim is—

1. The combination, with the plain and fluted rollers for first flattening the plants and then suspending them in a vertical position, one or more pairs of scutching-rollers, and a pair of combing-rollers, of the internally-grooved friction-disk L, the friction-wheel R, and lever $r$, connected with the rollers in such manner that the direction of travel of the said plain and fluted rollers may be controlled at will, substantially as described.

2. The breaker-scutcher herein described, consisting of a frame, the plain rollers $b$ and $f$, and the fluted rollers $c$ $d$ $e$, in combination with one or more pairs of scutching-drums, a pair of combing-rollers, and a double grooved friction-disk L, friction-wheel R, pinions S S', shaft $t'$, lever $r$, rod $r'$, and levers $r^2$ and $r^3$, substantially as described.

In testimony whereof we affix our signatures to the foregoing specification.

NORBERT DE LANDTSHEER.
THOMAS CRITCHLEY BARRACLOUGH.

Witnesses to the signature of Norbert de Landtsheer:
CHARLES ASSI,
LOUIS DUTILLS DE LA TURQUE, Witnesses to the signature of Thomas Critchley Barraclough:
JOHN G. WILSON,
WALTER GUNN.